E. France.
Carriage.
No. 41,765. Patented Mar. 1, 1864.
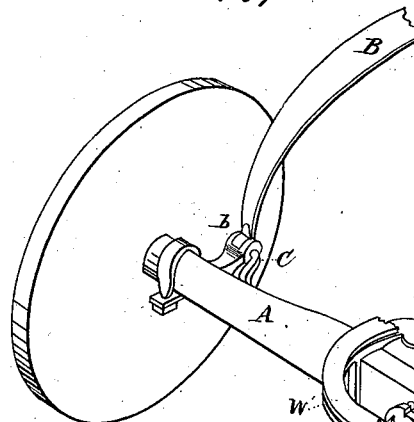
Fig. 1.
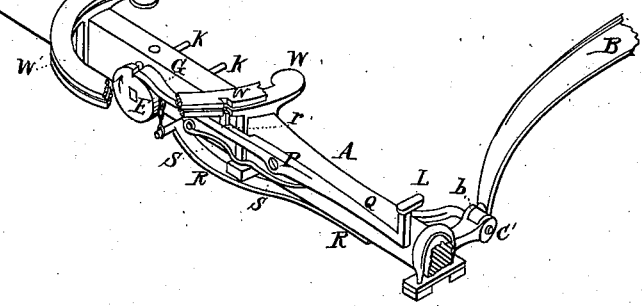
Fig. 2.
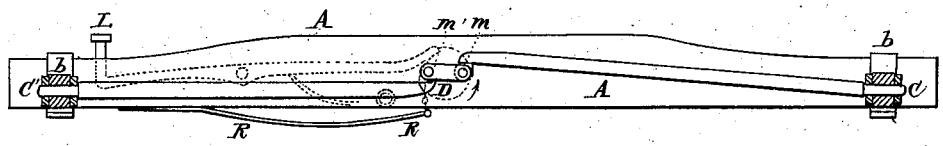
Fig. 3.
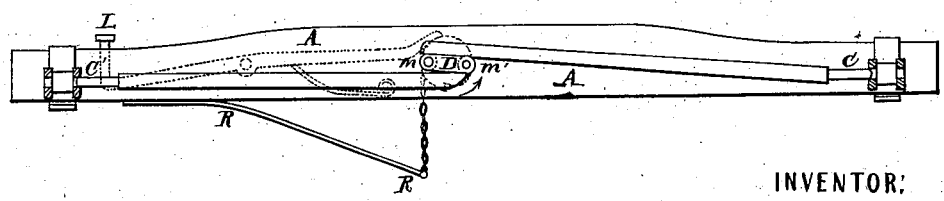
WITNESSES:
Joseph Gavett
J. L. Coombs
INVENTOR:
Enard France
by A. Pollok
his atty.

UNITED STATES PATENT OFFICE.

EDWARD FRANCE, OF COBLESKILL, NEW YORK.

IMPROVEMENT IN CARRIAGES.

Specification forming part of Letters Patent No. 41,765, dated March 1, 1864.

*To all whom it may concern:*

Be it known that I, EDWARD FRANCE, of Cobleskill, in the county of Schoharie and State of New York, have invented certain new and useful Improvements in Carriages; and I hereby declare the following to be a full, clear, and exact description of the same, reference being had to the accompanying drawing, in which—

Figure 1 is a perspective view of that part of a carriage to which my improvement is applied, and Figs. 2 and 3 are detail views in elevation illustrating the operation of the device subject-matter of this patent.

In carriages, particularly light or pleasure carriages, in which but one horse or draft-animal is used, or several horses are used in file, the attachment to the vehicle of the horse or horses is effected by means of shafts directly connected with the axle-tree. These shafts also serve the purpose of governing the course of the vehicle, and the harness of the horse is therefore so constructed as that the motions of the animal may be readily imparted to the carriage. The traces are thus attachable to the whiffletrees, which form part of the shafts, and are intended for pulling the carriage, while the breeching-straps are used to back or retain the vehicle.

From this it will be seen that the horse is necessarily tied to the shafts, and that to disengage the horse from the shafts is both a comparatively lengthy and difficult operation.

The danger to which persons driving restive or spirited animals are exposed, and the numerous accidents on record that have occurred and are constantly occurring, have led to the invention of contrivances the object of which is the sudden release or detaching of the horse from the vehicle. This has been effected in but one way, which consists in the detaching the traces from the whiffletree; but this has been found inefficient, because the horse remains still attached to the shafts by the breeching, and if not the dropping of the shafts often embarasses the horse by their interferring with its legs, and are otherwise frequently the cause of the upsetting of the carriage.

Another source of great inconvenience attendant upon carriages having shafts attached to their axle-trees in the manner heretofore in use consists in this, that the shafts are generally not readily detachable, whereby they occupy much room in carriage-houses.

To remedy these and other defects in carriages using but one horse, or several in file, is the object of my invention, and I have accomplished the same by a simple and inexpensive device applied to the axle-tree for the locking and unlocking the shafts or thills of carriages; and my invention consists in the combination of two bolts operating in unison, as described, with spring mechanism for the automatic locking or unlocking of the shafts; also, in the combination of two bolts, coupled as before referred to, and spring mechanism, arranged to operate as described, with a ratchet and pawl, or other device for locking the bolts; also, in combining with the bolts and spring, or the mechanical equivalents thereof, a pawl or lever, so arranged or located as that it may be readily actuated to release the spring-ratchet and effect the unlocking of the shafts; also, in a method of locking the wheel-plate or fifth-wheel by operating the spring-ratchet, for the purpose of steadying the course of the vehicle.

A in the accompanying drawings is the axle-tree, to which are attached, in the usual manner, the shafts B, by means of bolts passing through the eye of the thill-iron $b$. The bolts $c\ c'$ are extended to connect by means of hinge-joints $m\ m'$ with a lever, D, whose center pivot traverses the axle-tree and is mounted upon the opposite side of the axle-tree by an indented disk or ratchet wheel, E. Upon this ratchet-wheel a pawl or lever, G, pivoted at $p$, is caused to bear with pressure derived from a spring, $s$, so that the wheel is always locked unless the pawl is lifted out of contact with the ratchet.

The lever or pawl G is provided with a pedal, L, located at some convenient part, so that the driver may easily reach it with his foot or otherwise, and operate it at any given moment.

With the disk or ratchet is combined a spring, R, actuating it to rotate upon its axle in the direction indicated by the arrows, so that as soon as released by the pawl it will rotate, and consequently turn the lever D to withdraw the bolt from the thill-irons.

The pawl-lever G, I further provide with a stud, $r$, corresponding to two notches or recesses, $w$, in the wheel-plates W W', arranged in such manner in relation to each other that on depressing the pedal of the pawl for the purpose of unlocking the bolts the stud $r$ will at the same time enter the notches, and thus lock the wheel-plates, and thereby steady the course of the vehicle.

$k\ k'$ are handles or keys for winding up the spring R, and consequently for locking the bolts.

From the description of the drawings it will be understood that this apparatus may be used as or independently of a safety device. Supposing the horse about to run away, the driver will then press the lever G at L, thereby suddenly release the spring R, which, rotating the disk, will unlock the bolts, and thus disengage the shafts and sever the connection of the vehicle with the horse; at the same time the wheel-plate becomes locked by the introduction within the corresponding recesses, W, of the stud $r$. To attach the shafts it is only necessary to place the shafts in position and to give them a turn to the lever D by seizing the handle or key $k$ and imparting rotary motion on the pivot until the pawl falls in with the indentation.

It is obvious that this my invention is susceptible of many modifications as to the construction and arrangement; but I have shown one way for the purpose of illustrating the principle of my invention.

And having now fully described the same, I claim—

1. In combination with two bolts operating in unison, as described, the herein described spring mechanism for the automatic locking or unlocking of the shafts, as set forth.

2. The combination of two bolts, coupled as before referred to, and spring mechanism arranged to operate as described, with a ratchet and pawl for locking the bolts, substantially as herein set forth.

3. Combining with the bolts and spring a pawl and ratchet, so arranged or located as that it may be readily actuated to release the spring-ratchet and effect the unlocking of the shafts, substantially as herein set forth.

4. The method of locking the wheel-plate or fifth-wheel by operating the spring-ratchet for the purpose of steadying the course of the vehicle, substantially as herein set forth.

In testimony whereof I have signed my name to this specification before two subscribing witnesses.

EDWARD FRANCE.

Witnesses:
A. POLLOK,
EDM. F. BROWN.